United States Patent
Lei (10) Patent No.: US 12,523,810 B2
(45) Date of Patent: Jan. 13, 2026

(54) BACKLIGHT MODULE INCLUDING SWITCHABLE FIRST AND SECOND STATE AND DISPLAY DEVICE INCLUDING THE SAME

(71) Applicant: Guangzhou China Star Optoelectronics Semiconductor Display Technology Co., LTd., Guangdong (CN)

(72) Inventor: Hui Lei, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/697,728

(22) PCT Filed: Mar. 7, 2024

(86) PCT No.: PCT/CN2024/080441
§ 371 (c)(1),
(2) Date: Apr. 1, 2024

(87) PCT Pub. No.: WO2025/179621
PCT Pub. Date: Apr. 9, 2025

(65) Prior Publication Data
US 2025/0277928 A1    Sep. 4, 2025

(30) Foreign Application Priority Data
Feb. 29, 2024  (CN) .......................... 202410231827.7

(51) Int. Cl.
*F21V 8/00*  (2006.01)
*G02F 1/13*  (2006.01)

(52) U.S. Cl.
CPC ......... *G02B 6/0036* (2013.01); *G02B 6/0068* (2013.01); *G02F 1/1323* (2013.01)

(58) Field of Classification Search
CPC .... G02B 6/0036; G02B 6/0068; G02F 1/1323
See application file for complete search history.

(56) References Cited

U.S. PATENT DOCUMENTS

| | | | |
|---|---|---|---|
| 9,069,106 B1* | 6/2015 | Blessitt | F21S 8/04 |
| 2015/0116626 A1* | 4/2015 | Yu | G02B 6/0068 |
| | | | 362/606 |
| 2015/0268410 A1* | 9/2015 | Yu | G02B 6/0068 |
| | | | 349/58 |
| 2019/0146137 A1* | 5/2019 | Wang | G02B 6/0055 |
| | | | 362/613 |

(Continued)

*Primary Examiner* — Keith G. Delahoussaye
(74) *Attorney, Agent, or Firm* — PV IP PC; Wei Te Chung (57) ABSTRACT

A backlight module and a display device are disclosed. The light-guiding structure includes a first light-guiding surface opposite to the first light-emitting member and a second light-guiding surface opposite to the second light-emitting member, the first light-guiding surface has a specular reflective surface, and the second light-guiding surface has a diffuse reflective surface. When the backlight module is configured in the first state, the first light-emitting member emits lights, the second light-emitting member does not emit lights. When the backlight module is configured in the second state, at least the second light-emitting member emits lights.

20 Claims, 5 Drawing Sheets

(56) References Cited

U.S. PATENT DOCUMENTS

2023/0101373 A1\* 3/2023 Kim ................ G02B 6/0036
                                                                        362/613
2024/0192434 A1\* 6/2024 Lee ................. G02B 6/0068

\* cited by examiner

BACKLIGHT MODULE INCLUDING SWITCHABLE FIRST AND SECOND STATE AND DISPLAY DEVICE INCLUDING THE SAME

TECHNICAL FIELD

The present application relates to the field of display technologies, and more particularly, to a backlight module and a display device.

BACKGROUND

Display devices are used in various aspects of people's daily life, and different applications require different viewing angles of the display devices. For example, when a user is in an open environment in which privacy needs to be kept, such as entering a withdrawal password, watching private information by public transportation, or negotiating a business, it is necessary to display with a narrow viewing angle to achieve anti-peeping so as to protect personal privacy. When a user is in an environment in which there is a need for sharing, such as viewing the display device together with others, a wide viewing angle is required to achieve the purpose of sharing.

Currently, an anti-peeping film, such as a liquid crystal anti-peeping film, is often added to the display device to achieve the anti-peeping in real time. However, an existing anti-peeping film is complex in structure which greatly increases the cost of the display device.

TECHNICAL SOLUTION

An embodiment of the present application provides a backlight module and a display device, which can realize anti-peeping in real time, simplify the structure of the backlight module, and reduce the costs.

An embodiment of the present application provides a backlight module including:
  a light-guiding board, where the light-guiding board includes a bottom surface away from a light-emitting side of the backlight module, and a first side surface and a second side surface connected to the bottom surface, and the bottom surface is provided with a plurality of light-guiding structures;
  a first light bar, where the first light bar includes a first light-emitting member disposed on a side of the first side surface, and the first light-emitting member has a light-emitting direction toward the first side surface and emits lights in the first direction; and
  a second light bar, where the second light bar includes a second light-emitting member disposed on a side of the second side surface, the second light-emitting member has a light-emitting direction toward the second side surface and emits lights in the second direction, and the first direction is different from the second direction;
  where each of the plurality of light-guiding structures includes a first light-guiding surface disposed opposite to the first light-emitting member and a second light-guiding surface disposed opposite to the second light-emitting member, the first light-guiding surface has a specular reflective surface, the second light-guiding surface has a diffuse reflective surface, and the backlight module is switchable between a first state and a second state; where in a case that the backlight module is configured to the first state, the first light-emitting member emits lights, and the second light-emitting member does not emit lights; in a case that the backlight module is configured to the second state, at least the second light-emitting member emits lights.

According to the above object of the present application, an embodiment of the present application further provides a display device including a display panel and a backlight module, where the display panel is provided on a light-emitting side of the backlight module;
  where the backlight module includes:
    a light-guiding board, where the light-guiding board includes a bottom surface away from a light-emitting side of the backlight module, and a first side surface and a second side surface connected to the bottom surface, and the bottom surface is provided with a plurality of light-guiding structures;
    a first light bar, where the first light bar includes a first light-emitting member disposed on a side of the first side surface, and the first light-emitting member has a light-emitting direction toward the first side surface and emits lights in the first direction; and
    a second light bar, where the second light bar includes a second light-emitting member disposed on a side of the second side surface, the second light-emitting member has a light-emitting direction toward the second side surface and emits lights in the second direction, and the first direction is different from the second direction;
  where each of the plurality of light-guiding structures includes a first light-guiding surface disposed opposite to the first light-emitting member and a second light-guiding surface disposed opposite to the second light-emitting member, the first light-guiding surface has a specular reflective surface, the second light-guiding surface has a diffuse reflective surface, and the backlight module is switchable between a first state and a second state; where in a case that the backlight module is configured to the first state, the first light-emitting member emits lights, and the second light-emitting member does not emit lights; in a case that the backlight module is configured to the second state, at least the second light-emitting member emits lights.

DETAILED DESCRIPTION OF THE EMBODIMENTS

The technical solution in the embodiments of the present application will be clearly and completely described with reference to the accompanying drawings. It should be understood that the described embodiments are only part of the embodiments of the present application, and not all embodiments. Based on the embodiments in the present application, all other embodiments obtained by a person skilled in the art without involving any inventive effort are within the scope of the present application.

The following disclosure provides many different embodiments or examples for implementing the different structures of the present application. In order to simplify the disclosure of the present application, components and arrangements are described in specific examples below. Of course, they are merely examples and are not intended to limit the application. In addition, the present application may repeat reference numerals and/or reference letters in various examples, such repetition is for the purpose of simplicity and clarity, without itself indicating a relationship between the various embodiments and/or arrangements discussed. In addition, the present application provides examples of various specific processes and materials, but one of ordinary skill in the art will recognize the application of other processes and/or the use of other materials.

Figure 1:
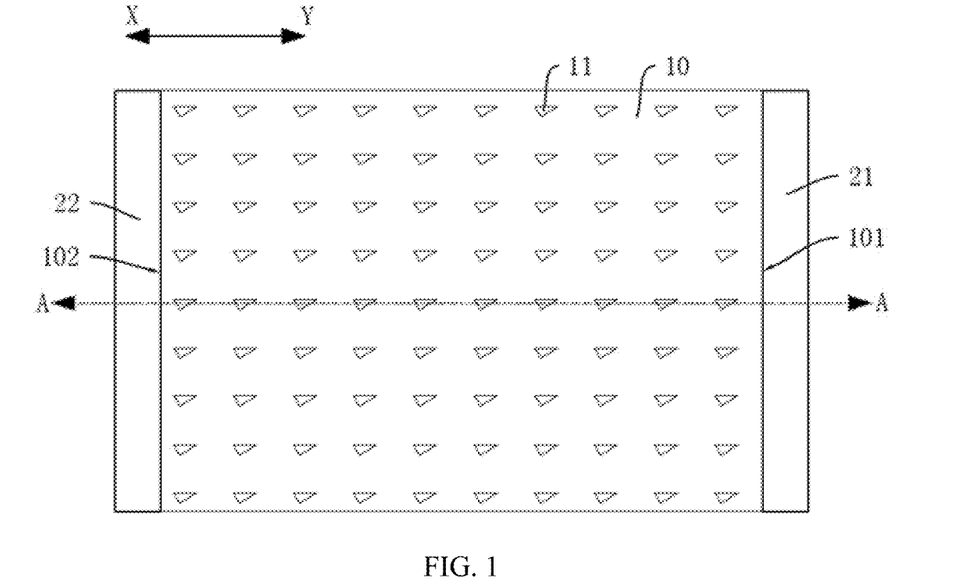
FIG. 1 is a schematic plan view of a backlight module according to an embodiment of the present application.
Figure 2:
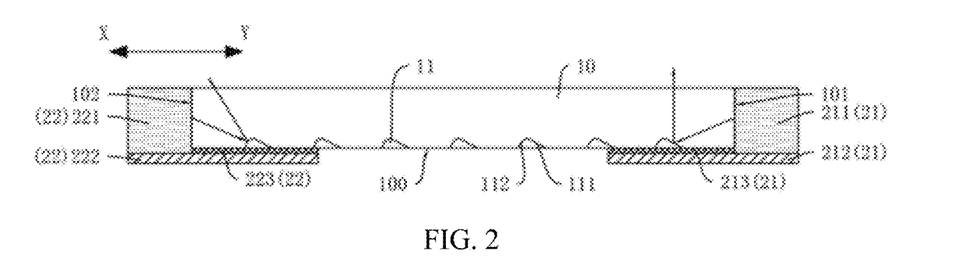
FIG. 2 is a schematic cross-sectional view of FIG. 1 taken along a line AA according to an embodiment of the present application.

An embodiment of the present application provides a backlight module. Referring to FIGS. 1 and 2, the backlight module includes a light-guiding board 10, a first light bar 21, and a second light bar 22.

The light-guiding board 10 includes a bottom surface 100 away from the light-exiting side of the backlight module, a first side surface 101 and a second side surface 102. The first side surface 101 and the second side surface 102 are connected to the bottom surface 100, and the bottom surface 100 is provided with a light-guiding structure 11. The first light bar 21 includes a first light-emitting member 211 disposed on a side of the first side surface 101, and the first light-emitting member 211 has a light-emitting direction toward the first side surface 101 and emits lights in the first direction X. The second light bar 22 includes a second light-emitting member 221 disposed on a side of the second side surface 102, and the second light-emitting member 221 has a light-emitting direction toward the second side surface 102 and emits light in the second direction Y. The first direction X being different from the second direction Y.

The light-guiding structure 11 includes a first light-guiding surface 111 disposed opposite to the first light-emitting member 211, and a second light-guiding surface 112 disposed opposite to the second light-emitting member 221. The first light-guiding surface 111 has a specular reflective surface, the second light-guiding surface 112 has a diffuse reflective surface, and the backlight module is switched between a first state and a second state. When the backlight module is configured to the first state, the first light-emitting member 211 emits lights, and the second light-emitting member 221 does not emit lights. When the backlight module is configured to the second state, at least the second light-emitting member 221 emits lights.

In an implementation and application process, the embodiments of the present application provide the light-guiding structure 11 of the light-guiding board 10 in the backlight module, and provide the first light-guiding surface 111 of the light-guiding structure 11 opposite to the first light-emitting member 211 as a specular reflective surface and the second light-guiding surface 112 of the light-guiding structure 11 opposite to the second light-emitting member 221 as a diffuse reflective surface, so that the first light bar 21 emits lights with a small viewing angle, and the second light bar 22 emits lights with a large viewing angle. When the backlight module is configured in the first state, the first light-emitting member 211 emits lights, and the second light-emitting member 221 does not emit lights. As such, when the lights emitted from the first light-emitting member 211 pass through the first light-guiding surface 111 with the specular reflective surface, a small viewing angle is provided to achieve the anti-peeping effect, and the first state of the backlight module is the anti-peeping state. When the backlight module is configured in the second state, at least the second light-emitting member 221 emits lights. As such, when the lights emitted from the second light-emitting member 221 pass through the second light-guiding surface 112 with the diffuse reflective surface, a large viewing angle is provided to achieve the sharing effect, and the second state of the backlight module is in the sharing state. Thus, the anti-peeping function in real time is realized, and the structure of the backlight module is simplified, which reduces the cost.

In an embodiment of the present application, an angle between the first light-guiding surface and the first direction is less than an angle between the second light-guiding surface and the second direction.

In an embodiment of the present application, an angle between the first light-guiding surface and the first direction is greater than or equal to 15° and less than or equal to 30°.

In an embodiment of the present application, the first light-guiding surface is planar and the second light-guiding surface is an arc surface.

In an embodiment of the present application, the second light-guiding surface projects toward a side away from the first light-guiding surface.

In an embodiment of the present application, the light-guiding board further includes a third side surface connected to the bottom surface, and the backlight module further includes a third light bar. The third light bar includes a third light-emitting member disposed on a side of the third side surface, the third light-emitting member has a light-emitting direction toward the third side surface and emits lights in a third direction, and the third direction is different from the first direction and the second direction.

The light-guiding structure includes a third light-guiding surface disposed opposite to the third light-emitting member, the third light-guiding surface has a specular reflective surface, and the third light-emitting member emits lights at least when the backlight module is configured in the first state.

In an embodiment of the present application, the third direction is opposite to the first direction.

In an embodiment of the present application, the light-guiding board further includes a fourth side surface connected to the bottom surface, the backlight module further includes a fourth light bar, and the fourth light bar includes a fourth light-emitting member disposed on a side of the fourth side surface. The fourth light-emitting member has a light-emitting direction toward the fourth side surface and emits lights in a fourth direction, and the fourth direction is different from the first direction and the second direction.

The light-guiding structure includes a fourth light-guiding surface disposed opposite to the fourth light-emitting member, and the fourth light-guiding surface has a diffuse reflective surface. The fourth light-emitting member does not emit lights when the backlight module is configured in the first state, and the fourth light-emitting member emits lights when the backlight module is configured in the second state.

In an embodiment of the present application, the fourth direction intersects the second direction, or the fourth direction is opposite to the second direction.

In an embodiment of the present application, the first light bar includes a first circuit board, the first light-emitting member is disposed on the first circuit board, the first circuit board is located on a side of the light-guiding board provided with the bottom surface, an end of the first circuit board is connected to the first light-emitting member, and the other end of the first circuit board overlaps the light-guiding board in a thickness direction of the light-guiding board.

The second light strip includes a second circuit board, the second light-emitting member is arranged on the second circuit board, the second circuit board is located on a side of the light-guiding board provided with the bottom surface, an end of the second circuit board is connected with the second light-emitting member, and the other end of the second circuit board overlaps the light-guiding board in the thickness direction of the light-guiding board.

In an embodiment of the present application, the first circuit board is provided with a first reflective layer on a surface opposite the light-guiding board, and the second circuit board is provided with a second reflective layer on a surface opposite the light-guiding board.

Specifically, with continued reference to FIGS. 1 and 2, the backlight module provided in the present embodiment includes a light-guiding board 10, and the light-guiding board 10 includes a bottom surface 100 away from the light-emitting side of the backlight module, a first side surface 101, and a second side surface 102. The first side surface 101 and the second side surface 102 are connected to the bottom surface 100. For example, when the light-guiding board 10 is a cuboid, the light-guiding board 10 has four side surfaces 102, as shown in FIG. 1.

The backlight module further includes a plurality of light bars disposed on the side surfaces of the light-guiding board 10. Specifically, the backlight module includes a first light bar 21 and a second light bar 22 disposed on the peripheral side of the light-guiding board 10. The first light bar 21 includes a first light-emitting member 211 disposed on a side of the first side surface 101 of the light-guiding board 10, the first light-emitting member 211 emits lights toward the first side surface 101, and the first light-emitting member 211 emits lights in the first direction X. The second light bar 22 includes a second light-emitting member 221 disposed on a side of the second side surface 102 of the light-guiding board 10, the second light-emitting member 221 emits lights toward the second side surface 102, and the second light-emitting member 221 emits lights in the second direction Y.

Here, the first direction X and the second direction Y are different, that is, the first light-emitting member 211 and the second light-emitting member 221 are located on different sides of the light-guiding board 10, for example, the first direction X may intersect with the second direction Y, or the first direction X may be opposite to the second direction Y.

In an embodiment, when the first direction X intersects with the second direction Y, the first direction X may be perpendicular to the second direction Y.

It should be noted that the first light bar 21 may include a plurality of first light-emitting members 211, and the first light-emitting members 211 may be LED light members provided on the first light bar 21. The plurality of first light-emitting members 211 may be arranged in a direction parallel to the first side surface 101 of the light-guiding board 10. Similarly, the second light bar 22 may include a plurality of second light-emitting members 221, and the second light-emitting members 221 may be LED light members provided on the second light bar 22. The plurality of second light-emitting members 221 may be arranged in a direction parallel to the second side 102 of the light-guiding board 10.

In an embodiment, the first light bar 21 includes a first circuit board 212, and the first light-emitting member 211 is located on the first side 101 of the light-guiding board 10, the first circuit board 212 is located on a side of the light-guiding board 10 close to the bottom surface 100, and the first light-emitting member 211 is disposed on the first circuit board 212. An end of the first circuit board 212 is connected to the first light-emitting member 211, and the other end of the first circuit board 212 overlaps with the light-guiding board 10 in the thickness direction of the light-guiding board 10. Further, the second light bar 22 includes a second circuit board 222, and the second light-emitting member 221 is located on the second side 102 of the light-guiding board 10, the second circuit board 222 is located on a side of the light-guiding board 10 close to the bottom surface 100, and the second light-emitting member 221 is disposed on the second circuit board 222. An end of the second circuit board 222 is connected to the second light-emitting member 221, and the other end of the second circuit board 222 overlaps with the light-guiding board 10 in the thickness direction of the light-guiding board 10.

In addition, in order to avoid that the first circuit board 212 and the second circuit board 222 overlapped with the light-guiding board 10 to affect the lights emitted from the backlight module, an embodiment of the present application provides a first reflective layer 213 on the side of the first circuit board 212 adjacent to the light-guiding board 10, and a second reflective layer 223 on the side of the second circuit board 222 adjacent to the light-guiding board 10. The first reflective layer 213 is provided on the surface of the first circuit board 212 facing the light-guiding board 10, and the second reflective layer 223 is provided on the surface of the second circuit board 222 facing the light-guiding board 10. Further, the lights emitted from the first light-emitting member 211 and the second light-emitting member 221 to the bottom surface 100 of the light-guiding board 10 can be reflected to improve the light-emitting efficiency of the backlight module.

In an embodiment, the backlight module further includes a reflective sheet provided on the bottom surface 100 of the light-guiding board 10, a diffuser sheet and a prism sheet provided on the light-emitting side of the light-guiding board 10 close to the backlight module, to further improve the light-emitting effect of the backlight module.

In the embodiment of the present application, the bottom surface 100 of the light-guiding board 10 is provided with the light-guiding structure 11 to adjust light emitted from the first light-emitting member 211 and the second light-emitting member 221 so that lights are emitted in a predetermined direction.

The light-guiding structure 11 includes a first light-guiding surface 111 disposed opposite to the first light-emitting member 211, and a second light-guiding surface 112 disposed opposite to the second light-emitting member 221. The first light-guiding surface 111 has a specular reflective surface such that the lights emitted from the first light-emitting member 211 are collimated lights. The second light-guiding surface 112 has a diffuse reflective surface such that the lights emitted from the second light-emitting member 221 are divergent lights.

It should be understood that the first light-guiding surface 111 is a surface of the light-guiding structure 11 facing the first light-emitting member 211, and the second light-guiding surface 112 is a surface of the light-guiding structure 11 facing the second light-emitting member 221.

Further, the backlight module includes the first state and the second state. When the backlight module is configured in the first state, the first light-emitting member 211 emits lights and the second light-emitting member 221 does not emit lights. As such, the backlight module emits collimated lights in the first state. When the backlight module is configured in the second state, at least the second light-emitting member 221 emits lights. As such, the backlight module emits divergent lights in the second state. In the present application, the light-guiding structure 11 of the light-guiding board 10 in the backlight module is designed to provide the first light-guiding surface 111 of the light-guiding structure 11 opposite to the first light-emitting member 211 as a specular reflective surface and the second light-guiding surface 112 of the light-guiding structure 11 opposite to the second light-emitting member 221 as a diffuse reflective surface, so that the lights emitted from the first light bar 21 has a small viewing angle and the lights emitted from the second light bar 22 has a large viewing angle. When the backlight module is configured in the first state, the first light-emitting member 211 emits lights, and the second light-emitting member 221 does not emit lights; and when the backlight module is configured in the second state, at least the second light-emitting member 221 emits lights. As such, the first state of the backlight module is an anti-peeping state, and the second state is a sharing state. The light-emitting angle of the backlight module in the first state ranges less than the light-emitting angle of the backlight module in the second state. In order to realize the anti-peeping function in real time, the structure of the backlight module is simplified, and the cost is reduced.

Figure 3:
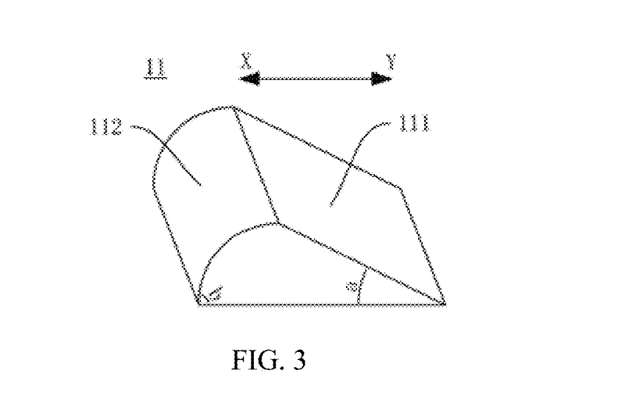
FIG. 3 is a schematic structural diagram of a light-guiding structure according to an embodiment of the present application.

In an embodiment, as shown in FIG. 3, the angle a between the first light-guiding surface 111 and the first direction X is less than the angle b between the second light-guiding surface 112 and the second direction Y, so that the lights emitted from the first light-emitting member 211 can be emitted in the forward direction after being guided by the first light-guiding surface 111, and preferably, when the backlight module is configured in the first state, the light emitted from the backlight module is emitted in the forward direction.

In an embodiment, the angle between the first light-guiding surface 111 and the first direction X is greater than or equal to 15°, and less than or equal to 30°.

It should be noted that the bottom surface 100 of the light-guiding board 10 is provided with a plurality of light-guiding structures 11, and the plurality of light-guiding structures 11 may be arranged in an array of a plurality of rows and a plurality of columns. Alternatively, in other embodiments of the present application, the plurality of light-guiding structures 11 may be arranged differently according to the luminance distribution of different areas, and this is not limited herein.

In an embodiment of the present application, with reference to FIGS. 1 and 2, in the present embodiment, the first direction X is opposite to the second direction Y, that is, the first light-emitting member 211 and the second light-emitting member 221 are located on opposite sides of the light-guiding board 10, respectively, and are oppositely illuminated.

The first light-guiding surface 111 and the second light-guiding surface 112 of the light-guiding structure 11 are respectively located on opposite sides of the light-guiding structure 11 so as to guide lights for the first light-emitting member 211 and the second light-emitting member 221, respectively. When the backlight module is configured in the first state, the first light-emitting member 211 may be turned on, and the second light-emitting member 221 may be turned off, so that the backlight module has a small viewing angle, thereby achieving the anti-peeping function. When the backlight module is configured in the second state, the second light-emitting member 221 may be turned on, the first light-emitting member 211 may be turned off, or the second light-emitting member 221 and the first light-emitting member 211 may be turned on, so as to realize a large viewing angle of the backlight module and the sharing function.

Figure 4:
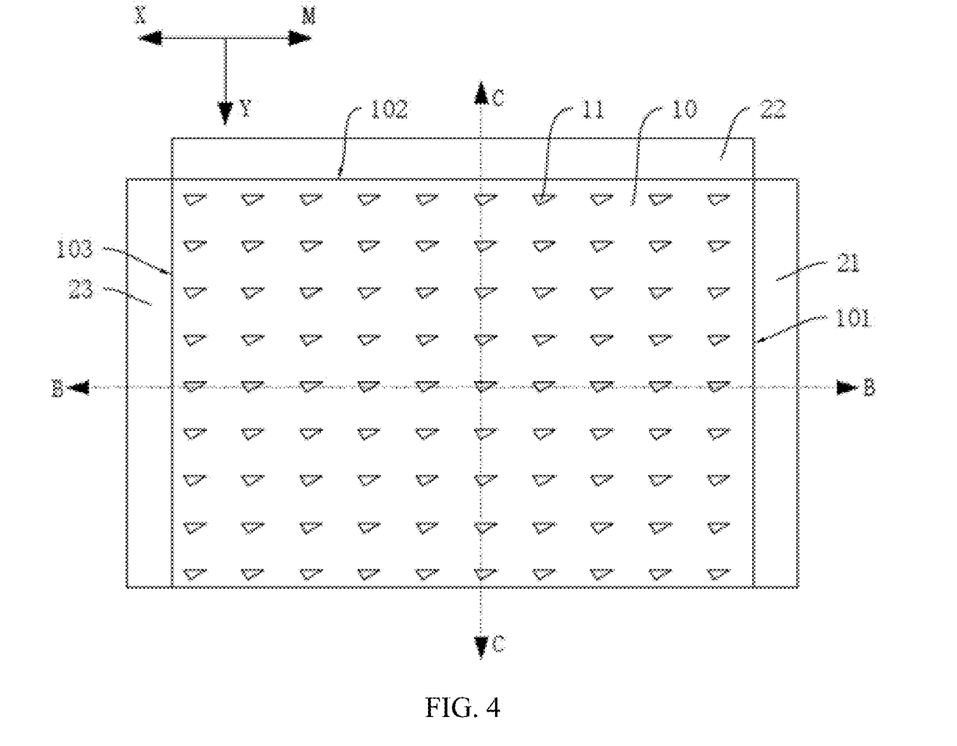
FIG. 4 is another schematic plan view of a backlight module according to an embodiment of the present application.
Figure 5:
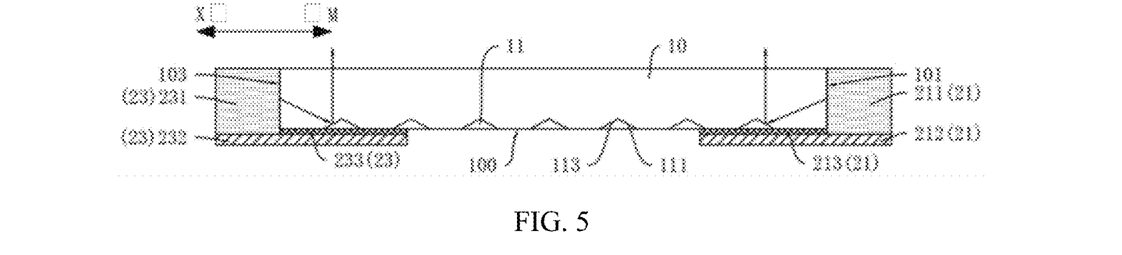
FIG. 5 is a schematic cross-sectional view of FIG. 4 taken along a line BB according to an embodiment of the present application.
Figure 6:
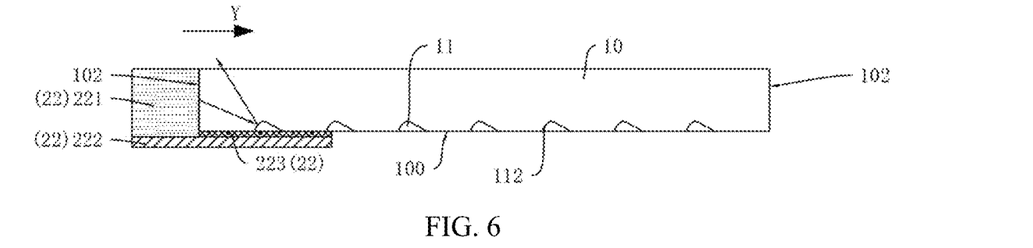
FIG. 6 is a schematic cross-sectional view of FIG. 4 taken along a line CC according to an embodiment of the present application.

In another embodiment of the present application, referring to FIG. 4, FIG. 5, and FIG. 6, in the present embodiment, the light-guiding board 10 further includes a third side surface 103 connected to the bottom surface 100, the backlight module further includes a third light bar 23, and the third light bar 23 includes a third light-emitting member 231 disposed on a side of the third side surface 103. The third light-emitting member 231 has a light-emitting direction toward the third side surface 103, and the third light-emitting member 231 emits lights in a third direction M, where the third direction M is different from the first direction X and the second direction Y.

The third light bar 23 further includes a third circuit board 232, the third light-emitting member 231 is provided on the third circuit board 232, and the third circuit board 232 is located on the side of the light-guiding board 10 provided with the bottom surface 100. An end of the third circuit board 232 is connected to the third light-emitting member 231, and the other end of the third circuit board 232 overlaps with the light-guiding board 10 in the thickness direction of the light-guiding board 10. In order to avoid that the part of the third circuit board 232 that overlapped with the light-guiding board 10 affects the light emission of the backlight module, an embodiment of the present application provides a third reflective layer 233 on a side of the third circuit board 232 adjacent to the light-guiding board 10. The third reflective layer 233 is provided on a surface of the third circuit board 232 facing the light-guiding board 10. Further, the lights emitted from the first light-emitting member 211, the second light-emitting member 221, and the third light-emitting member 231 to the bottom surface 100 of the light-guiding board 10 can be reflected to improve the light-emitting efficiency of the backlight module.

Alternatively, the third direction M may intersect with the first direction X, or the third direction M may be opposite to the first direction X. In the present embodiment, the third direction M is opposite to the first direction X, that is, the first side 101 and the third side 103 are opposite sides of the light-guiding board 10, and the second side 102 is connected between the first side 101 and the third side 103.

The third light-emitting member 231 and the first light-emitting member 211 are located on opposite sides of the light-guiding board 10, and lights emitted from the third light-emitting member 231 and the first light-emitting member 211 are toward each other. The second direction Y intersects with the first direction X and intersects with the third direction M.

In the present embodiment, the light-guiding structure 11 includes a third light-guiding surface 113 disposed opposite to the third light-emitting member 231, the third light-guiding surface 113 is a surface of the light-guiding structure 11 facing the third light-emitting member 231, and the third light-guiding surface 113 has a specular reflective surface. As such, the lights emitted from the third light-emitting member 231 can be emitted toward the positive direction after being guided by the third light-guiding surface 113, and preferably, when the backlight module is configured in the first state, the light-emitting direction of the backlight module is in the positive direction.

It should be noted that, since the light-guiding structure 11 can be patterned to form the bottom surface 100 of the light-guiding board 10 by using a laser or a cutter, when the first light-guiding surface 111 and the third light-guiding surface 113 are identical, the first light-guiding surface 111 and the third light-guiding surface 113 are located on opposite sides of the light-guiding structure 11 to reduce the processing difficulty of the light-guiding structure 11 and to simplify the manufacturing process of the light-guiding board 10.

In an embodiment, the depth of the light-guiding structure 11 may be greater than or equal to 5 microns, and less than or equal to 15 microns, for example, may be 5 microns, 6 microns, 7 microns, 8 microns, 9 microns, 10 microns, 11 microns, 12 microns, 13 microns, 14 microns, or 15 microns. The bottom width of the light-emitting side of the light-guiding structure 11 away from the backlight module may be greater than or equal to 30 microns, and less than or equal to 70 microns, for example, may be 30 microns, 35 microns, 40 microns, 45 microns, 50 microns, 55 microns, 60 microns, 65 microns, or 70 microns, and the above values are for illustration only and are not limited thereto.

In an embodiment, the angle between the third light-guiding surface 113 and the third direction M is greater than or equal to 15° and less than or equal to 30°. For example, the angle may be 15°, 20°, 25°, or 30°, and the above values are for illustration only and are not limited thereto.

Further, the second direction Y may be perpendicular to the first direction X and the third direction M.

It should be understood that the light-guiding structure 11 may have four faces; three of the four faces are the first light-guiding face 111, the second light-guiding face 112, and the third light-guiding face 113, respectively; and the remaining face of the four faces is disposed opposite to the second light-guiding face 112, and has a diffuse reflective face, to reduce the manufacturing process difficulty of the light-guiding structure 11.

According to the embodiment of the present application, the light-guiding structure 11 of the light-guiding board 10 in the backlight module is designed to provide the first light-guiding surface 111 of the light-guiding structure 11 opposite to the first light-emitting member 211 as a specular reflective surface and the second light-guiding surface 112 of the light-guiding structure 11 opposite to the second light-emitting member 221 as a diffuse reflective surface, so that the first light bar 21 emits the lights with a small viewing angle and the second light bar 22 emits the lights with large viewing angle. When the backlight module is configured in the first state, the first light-emitting member 211 and the third light-emitting member 231 emit lights, and the second light-emitting member 221 does not emit lights. When the backlight module is configured in a second state, the second light-emitting member 221 emits lights, or both the first light-emitting member 211, the second light-emitting member 221 and the third light-emitting member 231 emit lights, so that the first state of the backlight module is in the anti-peeping state, and the second state is the sharing state. Thus, the anti-peeping function in real time is realized, the structure of the backlight module is simplified, and the cost is reduced.

Figure 7:
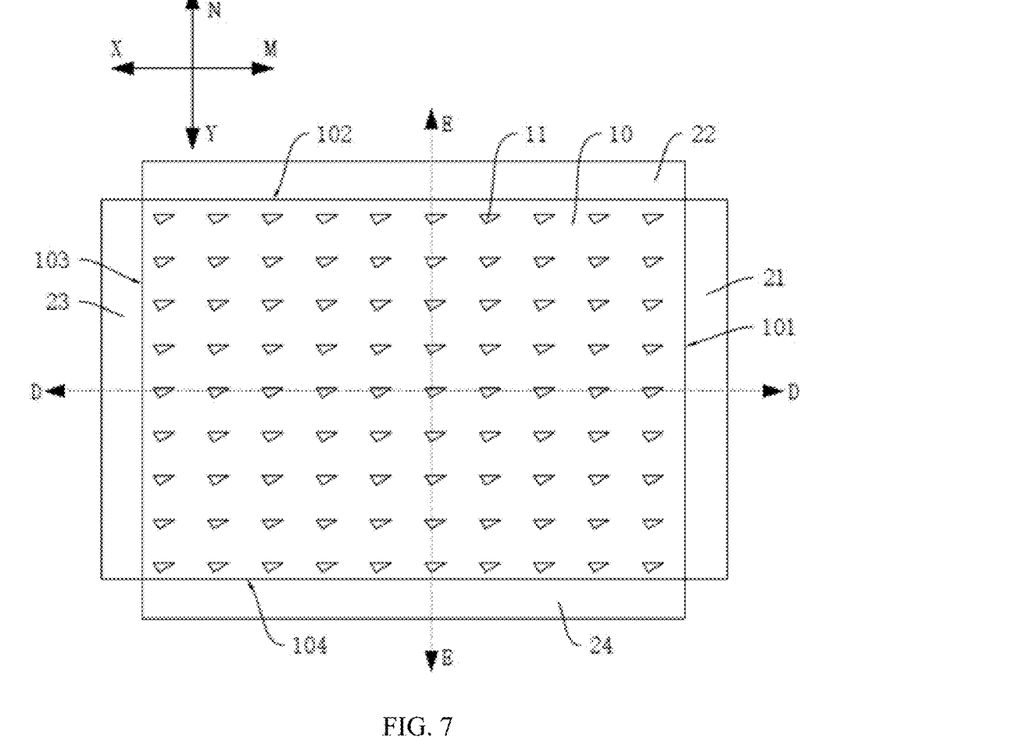
FIG. 7 is a schematic plan view of another backlight module according to an embodiment of the present application.
Figure 8:
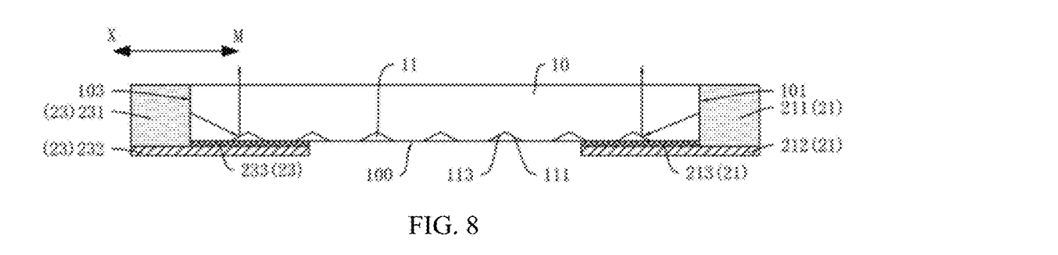
FIG. 8 is a schematic cross-sectional view of FIG. 7 taken along a line DD according to an embodiment of the present application.
Figure 9:
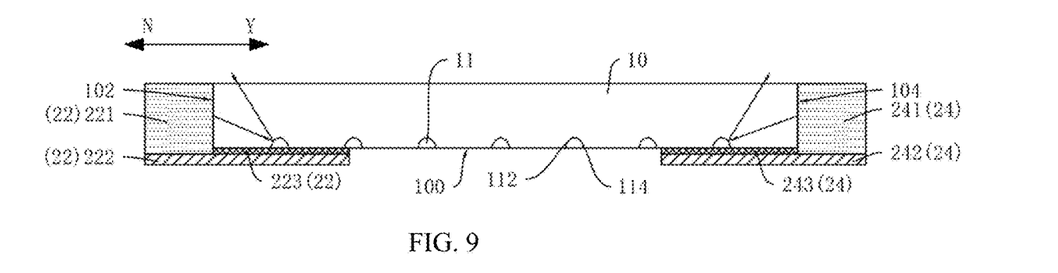
FIG. 9 is a schematic cross-sectional view of FIG. 7 taken along a line EE according to an embodiment of the present application.

In another embodiment of the present application, referring to FIG. 7, FIG. 8, and FIG. 9, the present embodiment differs from the embodiment shown in FIG. 5 in that the light-guiding board 10 further includes a fourth side surface 104 connected to the bottom surface 100, the backlight module further includes a fourth light bar 24, the fourth light bar 24 includes a fourth light-emitting member 241 disposed on a side of the fourth side surface 104, the fourth light-emitting member 241 has a light-emitting direction toward the fourth side surface 104 and emits lights along the fourth direction N, and the fourth direction N is different from the first direction X and the second direction Y.

The fourth direction N is opposite to the second direction Y, that is, the fourth light-emitting member 241 and the second light-emitting member 221 are respectively located on opposite sides of the light-guiding board 10, and the fourth light-emitting member 241 and the second light-emitting member 221 emit lights toward each other.

The light-guiding structure 11 includes a fourth light-guiding surface 114 disposed opposite to the fourth light-emitting member 241. The fourth light-guiding surface 114 is a surface of the light-guiding structure 11 facing the fourth light-emitting member 241. The fourth light-guiding surface 114 has a diffuse reflective surface. When the backlight module is configured in the first state, the fourth light-emitting member 241 does not emit lights. When the backlight module is configured in the second state, the fourth light-emitting member 241 emits lights.

The fourth light bar 24 further includes a fourth circuit board 242 on which the fourth light-emitting member 241 is provided, and the fourth circuit board 242 is located on a side of the light-guiding board 10 provided with the bottom surface 100. An end of the fourth circuit board 242 is connected to the fourth light-emitting member 241, and the other end of the fourth circuit board 242 overlaps with the light-guiding board 10 in the thickness direction of the light-guiding board 10. In order to avoid that the part of the fourth circuit board 242 overlapped with the light-guiding board 10 affects the light emission of the backlight module, the fourth reflective layer 243 is provided on the side of the fourth circuit board 242 adjacent to the light-guiding board 10, and the fourth reflective layer 243 is provided on a surface of the fourth circuit board 242 facing the light-guiding board 10. Further, the lights emitted from the first light-emitting member 211, the second light-emitting member 221, the third light-emitting member 231, and the fourth light-emitting member 241 to the bottom surface 100 of the light-guiding board 10 can be reflected to improve the light-emitting efficiency of the backlight module.

According to the embodiment of the present application, the light-guiding structure 11 of the light-guiding board 10 in the backlight module is designed to provide the first light-guiding surface 111 of the light-guiding structure 11 opposite to the first light-emitting member 211 as a specular reflective surface and the second light-guiding surface 112 of the light-guiding structure 11 opposite to the second light-emitting member 221 as a diffuse reflective surface, so that the first light bar 21 emits the lights with a small viewing angle and the second light bar 22 emits the lights with large viewing angle. When the backlight module is configured in the first state, the first light-emitting member 211 and the third light-emitting member 231 emit lights, and the second light-emitting member 221 does not emit lights. When the backlight module is configured in a second state, the second light-emitting member 221 and the fourth light-emitting member 241 emit lights, or all the first light-emitting member 211, the second light-emitting member 221, the third light-emitting member 231 and the fourth light-emitting member 241 emit lights, so that the first state of the backlight module is in the anti-peeping state, and the second state is the sharing state. Thus, the anti-peeping function in real time is realized, the structure of the backlight module is simplified, and the cost is reduced.

Figure 10:
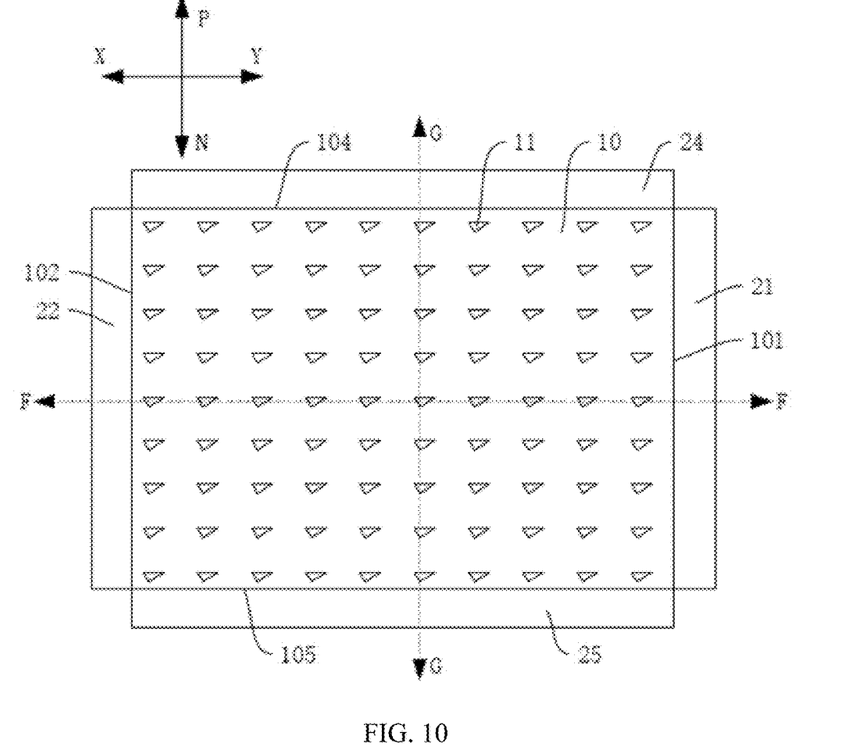
FIG. 10 is another plan view of a backlight module according to an embodiment of the present application.
Figure 11:
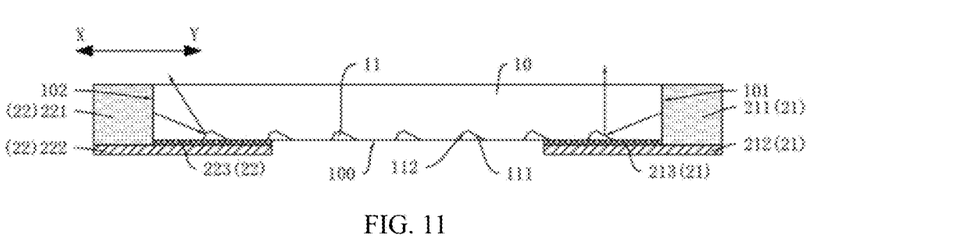
FIG. 11 is a schematic cross-sectional view of FIG. 10 taken along a line FF according to an embodiment of the present application.
Figure 12:
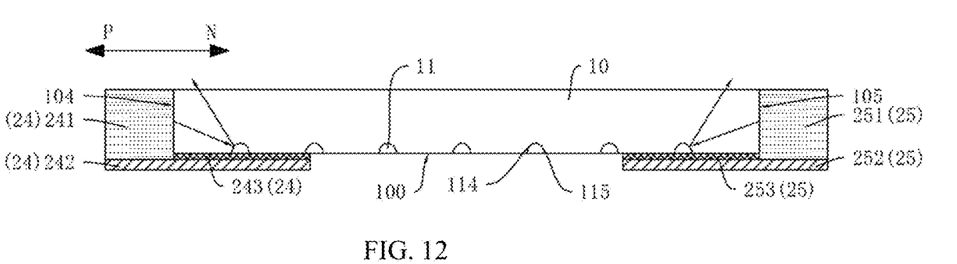
FIG. 12 is a schematic cross-sectional view of FIG. 10 taken along a line GG according to an embodiment of the present application.

In another embodiment of the present application, referring to FIG. 10, FIG. 11 and FIG. 12, the present embodiment differs from the embodiment shown in FIG. 1 in that the light-guiding board 10 further includes a fourth side 104 connected to the bottom surface 100 and a fifth side 105 connected to the bottom surface 100, and the backlight module further includes a fourth light bar 24 and a fifth light bar 25.

Specifically, the fourth light bar 24 includes a fourth light-emitting member 241 disposed on a side of the fourth side surface 104, the fourth light-emitting member 241 has a light-emitting direction toward the fourth side surface 104 and emits lights in the fourth direction N, and the fourth direction N is different from both the first direction X and the second direction Y, where the fourth direction N intersects the second direction Y.

The light-guiding structure 11 includes a fourth light-guiding surface 114 disposed opposite to the fourth light-emitting member 241. The fourth light-guiding surface 114 has a diffuse reflective surface. When the backlight module is configured in the first state, the fourth light-emitting member 241 does not emit lights. When the backlight module is configured in the second state, the fourth light-emitting member 241 emits lights.

The fifth light bar 25 includes a fifth light-emitting member 251 disposed on a side of the fifth side surface 105, the fifth light-emitting member 251 has a light-emitting direction toward the fifth side surface 105 and emits lights in the fifth direction P, and the fifth direction P is different from the first direction X and the second direction Y. Here, the fifth direction P is opposite to the fourth direction N, that is, the fourth light-emitting member 241 and the fifth light-emitting member 251 are provided on opposite sides of the light-guiding board 10, respectively, and the fourth light-emitting member 241 and the fifth light-emitting member 251 emit lights toward each other.

The light-guiding structure 11 includes a fifth light-guiding surface 115 disposed opposite to the fifth light-emitting member 251. The fifth light-guiding surface 115 is a surface of the light-guiding structure 11 facing the fifth light-emitting member 251. The fifth light-guiding surface 115 has a diffuse reflective surface. When the backlight module is configured in the first state, the fifth light-emitting member 251 does not emit lights. When the backlight module is configured in the second state, the fifth light-emitting member 251 emits lights.

In the present embodiment, the first side 101 and the second side 102 are opposite sides of the light-guiding board 10, and the fourth side 104 and the fifth side 105 are opposite sides of the light-guiding board 10.

Further, the fourth light bar 24 further includes a fourth circuit board 242 on which the fourth light-emitting member 241 is provided, and the fourth circuit board 242 is located on a side of the light-guiding board 10 provided with the bottom surface 100, an end of the fourth circuit board 242 is connected to the fourth light-emitting member 241, and the other end of the fourth circuit board 242 overlaps with the light-guiding board 10 in the thickness direction of the light-guiding board 10. In order to avoid that the part of the fourth circuit board 242 overlapped with the light-guiding board 10 affects the light emission of the backlight module, the fourth reflective layer 243 is provided on the side of the fourth circuit board 242 adjacent to the light-guiding board 10, and the fourth reflective layer 243 is provided on the surface of the fourth circuit board 242 facing the light-guiding board 10. Further, the lights emitted from the first light-emitting member 211, the second light-emitting member 221, the fourth light-emitting member 241, and the fifth light-emitting member 251 to the bottom surface 100 of the light-guiding board 10 can be reflected to improve the light-emitting efficiency of the backlight module.

The fifth light bar 25 further includes a fifth circuit board 252 on which the fifth light-emitting member 251 is provided, and the fifth circuit board 252 is located on a side of the light-guiding board 10 provided with the bottom surface 100. An end of the fifth circuit board 252 is connected to the fifth light-emitting member 251, and the other end of the fifth circuit board 252 overlaps with the light-guiding board 10 in the thickness direction of the light-guiding board 10. In order to avoid that the part of the fifth circuit board 252 overlapped with the light-guiding board 10 affects the light emission of the backlight module, an embodiment of the present application provides a fifth reflective layer 253 on a side of the fifth circuit board 252 adjacent to the light-guiding board 10, and the fifth reflective layer 253 is provided on a surface of the fifth circuit board 252 facing the light-guiding board 10. Further, the lights emitted from the first light-emitting member 211, the second light-emitting member 221, the fourth light-emitting member 241, and the fifth light-emitting member 251 to the bottom surface 100 of the light-guiding board 10 can be reflected to improve the light output efficiency of the backlight module.

According to the embodiment of the present application, the light-guiding structure 11 of the light-guiding board 10 in the backlight module is designed to provide the first light-guiding surface 111 of the light-guiding structure 11 opposite to the first light-emitting member 211 as a specular reflective surface and the second light-guiding surface 112 of the light-guiding structure 11 opposite to the second light-emitting member 221 as a diffuse reflective surface, so that the first light bar 21 emits the lights with a small viewing angle and the second light bar 22 emits the lights with large viewing angle. When the backlight module is configured in the first state, the first light-emitting member 211, the second light-emitting member 221, the fourth light-emitting member 241 and the fifth light-emitting member 251 do not emit lights. When the backlight module is configured in a second state, the second light-emitting member 221, the fourth light-emitting member 241, and the fifth light-emitting member 251 emit lights, or all the first light-emitting member 211, the second light-emitting member 221, the fourth light-emitting member 241 and the fifth light-emitting member 251 emit lights, so that the first state of the backlight module is in the anti-peeping state, and the second state is the sharing state. Thus, the anti-peeping function in real time is realized, the structure of the backlight module is simplified, and the cost is reduced.

It should be understood that the first light-guiding surface 111 and the third light-guiding surface 113 in the above-described embodiment are smooth surfaces and can perform specular reflection, that the second light-guiding surface 112, the fourth light-guiding surface 114, and the fifth light-guiding surface 115 are rough surfaces in circular arc shapes and can perform diffuse reflection, and that the second light-guiding surface 112 protrudes toward a side away from the first light-guiding surface 111, and that the fourth light-guiding surface 114 and the fifth light-guiding surface 115 protrude toward a side away from the center of the light-guiding structure 11, so that light emitted from the second light-emitting member 221, the fourth light-emitting member 241, and the fifth light-emitting member 251 can be better dispersed and dispersed to a larger range of the viewing angle, thereby improving the viewing angle range and the light-emitting effect of the backlight module in the second state.

It should be noted that, in the embodiments of the present application, the light-guiding board 10 is described in terms of a top view shape as a quadrangle, and the light-guiding board 10 may be provided with other polygons, so that each light-emitting member is located on a side surface of the light-guiding board 10 and emits light toward the direction close to the light-guiding board 10. The light-guiding structure 11 in the light-guiding board 10 forms a light-guiding surface with respect to a side surface of each light-emitting member, and at least one specular reflective surface and one diffuse reflecting surface need to be formed. The specular reflective surface may enable the lights emitted from the light-emitting member to be emitted in a collimated manner so as to realize the light emission at the small viewing angle, and the diffuse reflective surface may enable the lights emitted from the light-emitting member to be emitted in a divergent manner so as to realize the light emission at the large viewing angle, thereby enabling the backlight module to switch between the anti-peeping state and the sharing state.

In an embodiment of the present application, the light-guiding structure 11 is uniformly distributed in the light-guiding board 10. In other embodiments of the present application, the backlight module includes a first region and a second region, and since the brightness of the original first region is less than that of the second region, the distribution density of the light-guiding structure 11 in the first region is set greater than that of the light-guiding structure 11 in the second region in the embodiments of the present application. As such, the average brightness of the first region is improved to be equal to the average brightness of the second region, thereby improving the problem of uneven brightness distribution in the backlight module. For example, the first region may be an area around the backlight module, the second region may be an area in the middle of the backlight module. The area around the backlight module may be reduced in brightness due to loss of lights shielded by the frame. The embodiment of the present application may improve brightness uniformity of the backlight module. Further, the first region and the second region may be other regions in the backlight module in which the brightness distribution is not uniform, and are not limited herein.

Figure 13:
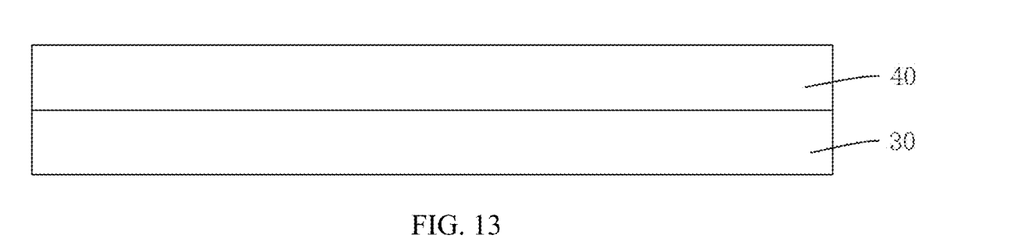
FIG. 13 is a schematic structural diagram of a display device according to an embodiment of the present application.

In addition, an embodiment of the present application further provides a display device. Referring to FIG. 1 and FIG. 13, the display device includes a display panel 40 and a backlight module 30 as described in the above-described embodiment, and the display panel 40 is disposed on the light-emitting side of the backlight module 30.

When the backlight module 30 is configured in the first state, the light emission with small viewing angle can be realized, the display device can realize the anti-peeping mode, and when the backlight module 30 is configured in the second state, the light emission with large viewing angle can be realized, the display device can realize the sharing mode. Therefore, in the embodiment of the present application, by controlling the turn-on and turn-off of the light-emitting member on the side surface of the light-guiding board 10, the anti-peeping mode and the sharing mode of the display device can be switchable, and no additional structure such as an anti-peeping film is needed, thereby simplifying the process and reducing the cost.

In the above-mentioned embodiments, the description of each embodiment has its own emphasis, and parts not described in detail in a certain embodiment may be referred to the related description of other embodiments.

The present application has been described in detail with reference to a backlight module and a display device according to an embodiment of the present invention. The principles and embodiments of the present application are described herein using specific examples. The description of the above embodiments is merely provided to help understand the technical solution and the core idea of the present application. It should be understood by those of ordinary skill in the art that modifications may still be made to the technical solutions described in the foregoing embodiments, or equivalents may be made to some of the technical features therein. These modifications or equivalents do not depart the essence of the corresponding technical solutions from the scope of the technical solutions of the embodiments of the present application.

The invention claimed is:
1. A backlight module, comprising:
a light-guiding board, wherein the light-guiding board comprises a bottom surface away from a light-emitting side of the backlight module, and a first side surface and a second side surface connected to the bottom surface, and the bottom surface is provided with a plurality of light-guiding structures;
a first light bar, wherein the first light bar comprises a first light-emitting member disposed on a side of the first side surface, and the first light-emitting member has a light-emitting direction toward the first side surface and emits lights in the first direction; and
a second light bar, wherein the second light bar comprises a second light-emitting member disposed on a side of the second side surface, the second light-emitting member has a light-emitting direction toward the second side surface and emits lights in the second direction, and the first direction is different from the second direction;
wherein each of the plurality of light-guiding structures includes a first light-guiding surface disposed opposite to the first light-emitting member and a second light-guiding surface disposed opposite to the second light-emitting member, the first light-guiding surface has a specular reflective surface, the second light-guiding surface has a diffuse reflective surface, and the backlight module is switchable between a first state and a second state; wherein in a case that the backlight module is configured to the first state, the first light-emitting member emits lights, and the second light-emitting member does not emit lights; in a case that the backlight module is configured to the second state, at least the second light-emitting member emits lights;

wherein the light-guiding board further comprises a third side surface connected to the bottom surface, the backlight module further comprises a third light bar, the third light bar comprises a third light-emitting member disposed on a side of the third side surface, the third light-emitting member has a light-emitting direction toward the third side surface and emits lights in a third direction, and the third direction is different from the first direction and the second direction;

the light-guiding structure includes a third light-guiding surface disposed opposite to the third light-emitting member, the third light-guiding surface has a specular reflective surface, and the third light-emitting member emits lights at least when the backlight module is configured in the first state.

2. The backlight module of claim 1, wherein an angle included between the first light-guiding surface and the first direction is less than an angle included between the second light-guiding surface and the second direction.

3. The backlight module of claim 1, wherein the angle included between the first light-guiding surface and the first direction is greater than or equal to 15° and less than or equal to 30°.

4. The backlight module of claim 1, wherein the first light-guiding surface is a planar surface and the second light-guiding surface is an arc surface.

5. The backlight module of claim 4, wherein the second light-guiding surface protrudes toward a side away from the first light-guiding surface.

6. The backlight module of claim 1, wherein the third direction is opposite to the first direction.

7. The backlight module of claim 1, wherein the light-guiding board further comprises a fourth side surface connected to the bottom surface, the backlight module further comprises a fourth light bar, the fourth light bar comprises a fourth light-emitting member disposed on a side of the fourth side surface, the fourth light-emitting member has a light-emitting direction toward the fourth side surface and emits lights in a fourth direction, and the fourth direction is different from the first direction and the second direction;

the light-guiding structure includes a fourth light-guiding surface disposed opposite to the fourth light-emitting member, the fourth light-guiding surface has a diffuse reflective surface, the fourth light-emitting member does not emit lights when the backlight module is configured in the first state, and the fourth light-emitting member emits lights when the backlight module is configured in the second state.

8. The backlight module of claim 7, wherein the fourth direction intersects with the second direction, or the fourth direction is opposite to the second direction.

9. The backlight module of claim 1, wherein the first light bar includes a first circuit board, the first light-emitting member is disposed on the first circuit board, the first circuit board is located on a side of the light-guiding board provided with the bottom surface, an end of the first circuit board is connected to the first light-emitting member, and another end of the first circuit board overlaps with the light-guiding board in a thickness direction of the light-guiding board;

the second light bar comprises a second circuit board, the second light-emitting member is disposed on the second circuit board, the second circuit board is located on a side of the light-guiding board provided with the bottom surface, an end of the second circuit board is connected with the second light-emitting member, and another end of the second circuit board overlaps with the light-guiding board in the thickness direction of the light-guiding board.

10. The backlight module of claim 9, wherein a surface of the first circuit board facing the light-guiding board has a first reflective layer, and a surface of the second circuit board facing the light-guiding board has a second reflective layer.

11. A display device, comprising a display panel and a backlight module, wherein the display panel is disposed on a light-emitting side of the backlight module;

wherein the backlight module comprises:
a light-guiding board, wherein the light-guiding board comprises a bottom surface away from a light-emitting side of the backlight module, and a first side surface and a second side surface connected to the bottom surface, and the bottom surface is provided with a plurality of light-guiding structures;

a first light bar, wherein the first light bar comprises a first light-emitting member disposed on a side of the first side surface, and the first light-emitting member has a light-emitting direction toward the first side surface and emits lights in the first direction; and a second light bar, wherein the second light bar comprises a second light-emitting member disposed on a side of the second side surface, the second light-emitting member has a light-emitting direction toward the second side surface and emits lights in the second direction, and the first direction is different from the second direction;

wherein each of the plurality of light-guiding structures includes a first light-guiding surface disposed opposite to the first light-emitting member and a second light-guiding surface disposed opposite to the second light-emitting member, the first light-guiding surface has a specular reflective surface, the second light-guiding surface has a diffuse reflective surface, and the backlight module is switchable between a first state and a second state; wherein in a case that the backlight module is configured to the first state, the first light-emitting member emits lights, and the second light-emitting member does not emit lights; in a case that the backlight module is configured to the second state, at least the second light-emitting member emits lights;

wherein the light-guiding board further comprises a third side surface connected to the bottom surface, the backlight module further comprises a third light bar, the third light bar comprises a third light-emitting member disposed on a side of the third side surface, the third light-emitting member has a light-emitting direction toward the third side surface and emits lights in a third direction, and the third direction is different from the first direction and the second direction;

the light-guiding structure includes a third light-guiding surface disposed opposite to the third light-emitting member, the third light-guiding surface has a specular reflective surface, and the third light-emitting member emits lights at least when the backlight module is configured in the first state.

12. The display device of claim 11, wherein an angle included between the first light-guiding surface and the first direction is less than an angle included between the second light-guiding surface and the second direction.

13. The display device of claim 11, wherein the angle included between the first light-guiding surface and the first direction is greater than or equal to 15° and less than or equal to 30°.

14. The display device of claim 11, wherein the first light-guiding surface is a planar surface and the second light-guiding surface is an arc surface.

15. The display device of claim 14, wherein the second light-guiding surface protrudes toward a side away from the first light-guiding surface.

16. The display device of claim 11, wherein the third direction is opposite to the first direction.

17. The display device of claim 11, wherein the light-guiding board further comprises a fourth side surface connected to the bottom surface, the backlight module further comprises a fourth light bar, the fourth light bar comprises a fourth light-emitting member disposed on a side of the fourth side surface, the fourth light-emitting member has a light-emitting direction toward the fourth side surface and emits lights in a fourth direction, and the fourth direction is different from the first direction and the second direction;

the light-guiding structure includes a fourth light-guiding surface disposed opposite to the fourth light-emitting member, the fourth light-guiding surface has a diffuse reflective surface, the fourth light-emitting member does not emit lights when the backlight module is configured in the first state, and the fourth light-emitting member emits lights when the backlight module is configured in the second state.

18. The display device of claim 17, wherein the fourth direction intersects with the second direction, or the fourth direction is opposite to the second direction.

19. A backlight module, comprising:
a light-guiding board, wherein the light-guiding board comprises a bottom surface away from a light-emitting side of the backlight module, and a first side surface and a second side surface connected to the bottom surface, and the bottom surface is provided with a plurality of light-guiding structures;
a first light bar, wherein the first light bar comprises a first light-emitting member disposed on a side of the first side surface, and the first light-emitting member has a light-emitting direction toward the first side surface and emits lights in the first direction; and
a second light bar, wherein the second light bar comprises a second light-emitting member disposed on a side of the second side surface, the second light-emitting member has a light-emitting direction toward the second side surface and emits lights in the second direction, and the first direction is different from the second direction;

wherein each of the plurality of light-guiding structures includes a first light-guiding surface disposed opposite to the first light-emitting member and a second light-guiding surface disposed opposite to the second light-emitting member, the first light-guiding surface has a specular reflective surface, the second light-guiding surface has a diffuse reflective surface, and the backlight module is switchable between a first state and a second state; wherein in a case that the backlight module is configured to the first state, the first light-emitting member emits lights, and the second light-emitting member does not emit lights; in a case that the backlight module is configured to the second state, at least the second light-emitting member emits lights;

wherein the light-guiding board further comprises a fourth side surface connected to the bottom surface, the backlight module further comprises a fourth light bar, the fourth light bar comprises a fourth light-emitting member disposed on a side of the fourth side surface, the fourth light-emitting member has a light-emitting direction toward the fourth side surface and emits lights in a fourth direction, and the fourth direction is different from the first direction and the second direction;

the light-guiding structure includes a fourth light-guiding surface disposed opposite to the fourth light-emitting member, the fourth light-guiding surface has a diffuse reflective surface, the fourth light-emitting member does not emit lights when the backlight module is configured in the first state, and the fourth light-emitting member emits lights when the backlight module is configured in the second state.

20. The backlight module of claim 19, wherein the fourth direction intersects with the second direction, or the fourth direction is opposite to the second direction.

* * * * *